(12) United States Patent
Heatherington et al.

(10) Patent No.: US 6,986,536 B1
(45) Date of Patent: Jan. 17, 2006

(54) VEHICLE BUMPER BEAM

(75) Inventors: David W. Heatherington, Spring Lake, MI (US); Scott C. Glasgow, Spring Lake, MI (US); Bruce W. Lyons, Grand Haven, MI (US)

(73) Assignee: Shape Corporation, Grand Haven, MI (US)

( * ) Notice: Subject to any disclaimer, the term of this patent is extended or adjusted under 35 U.S.C. 154(b) by 0 days.

(21) Appl. No.: 10/877,326

(22) Filed: Jun. 25, 2004

(51) Int. Cl.
*B60R 19/02* (2006.01)

(52) U.S. Cl. ..................................... 293/102
(58) Field of Classification Search ............... 293/102, 293/117, 120, 121, 132, 133, 154, 155; 296/146.6, 296/187.01, 187.03, 187.09, 187.1; 188/377
See application file for complete search history.

(56) References Cited

U.S. PATENT DOCUMENTS

| | | | |
|---|---|---|---|
| 4,018,466 A | 4/1977 | Norlin | |
| 4,072,334 A | 2/1978 | Seegmiller et al. | |
| 4,391,464 A | 7/1983 | Masotti et al. | |
| 4,397,490 A | 8/1983 | Evans et al. | |
| 4,422,680 A | 12/1983 | Goupy | |
| 4,533,166 A | 8/1985 | Stokes | |
| 4,762,352 A | 8/1988 | Enomoto | |
| 4,830,416 A | 5/1989 | Matsuoka | |
| 5,154,462 A * | 10/1992 | Carpenter | 293/120 |
| 5,577,796 A | 11/1996 | Clausen | |
| 5,722,708 A | 3/1998 | Jonsson | |
| 5,785,367 A * | 7/1998 | Baumann et al. | 293/133 |
| 5,997,058 A | 12/1999 | Pedersen | |
| 6,179,355 B1 | 1/2001 | Chou et al. | |
| 6,343,820 B1 | 2/2002 | Pedersen | |
| 6,349,521 B1 | 2/2002 | McKeon et al. | |
| 6,352,297 B1 | 3/2002 | Sundgren et al. | |
| 6,360,441 B1 | 3/2002 | Himsl et al. | |
| 6,398,275 B1 | 6/2002 | Hartel et al. | |
| 6,485,072 B1 | 11/2002 | Werner et al. | |
| 6,540,276 B2 | 4/2003 | Azuchi et al. | |
| 6,592,158 B2 | 7/2003 | Kettler et al. | |
| 6,669,252 B2 | 12/2003 | Roussel et al. | |
| 6,684,505 B2 | 2/2004 | Sundgren et al. | |
| 6,726,259 B2 | 4/2004 | Kettler et al. | |
| 6,726,261 B2 | 4/2004 | Goto et al. | |
| 6,726,262 B2 | 4/2004 | Marijnissen et al. | |

(Continued)

FOREIGN PATENT DOCUMENTS

WO    WO 03/037688 A1    5/2002

*Primary Examiner*—H. Gutman
(74) *Attorney, Agent, or Firm*—Price, Heneveld, Cooper, DeWitt & Litton LLP

(57) ABSTRACT

A bumper beam includes an open front section made from a high-strength material such as ultra-high-strength steel (UHSS) material, and further includes a mating back section made of lower strength material attached to a rear side of the front section along abutting flanges. The front and back sections combine to define different tubular cross sections along their length, thus providing selected stiffness and strength at critical areas of the bumper beam. The front section can be roll-formed, and the back section can be stamped, thus taking advantage of roll-forming processes' ability to form high-strength materials, while allowing the back section to have a more complicated shape and be stamped. For example, the back section can be made from a material selected from a group consisting of HSLA steel, aluminum, and/or polymeric material. The back section is attached to the beam using welding or mechanical attachment.

36 Claims, 4 Drawing Sheets

U.S. PATENT DOCUMENTS

| | | | |
|---|---|---|---|
| 6,817,652 B2 * | 11/2004 | Graber et al. ............ | 296/146.6 |
| 2001/0017473 A1 | 8/2001 | Yamamoto | |
| 2001/0054827 A1 | 12/2001 | Sundgren et al. | |
| 2002/0180222 A1 | 12/2002 | Janssen | |
| 2003/0034657 A1 | 2/2003 | Garcia et al. | |
| 2003/0218341 A1 | 11/2003 | Jonsson et al. | |
| 2004/0007886 A1 | 1/2004 | Hallergren | |
| 2004/0066048 A1 | 4/2004 | Mooijman et al. | |

* cited by examiner

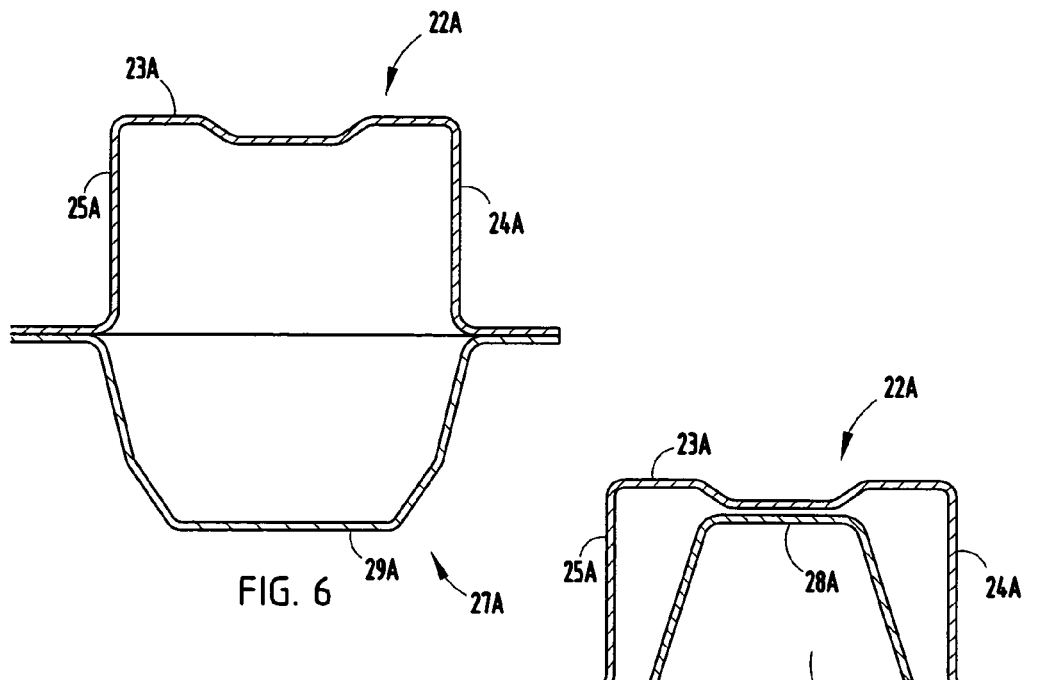
FIG. 6
FIG. 7
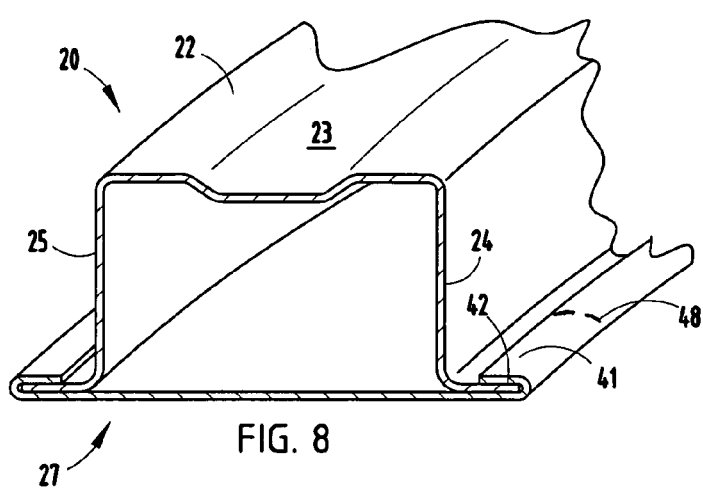
FIG. 8
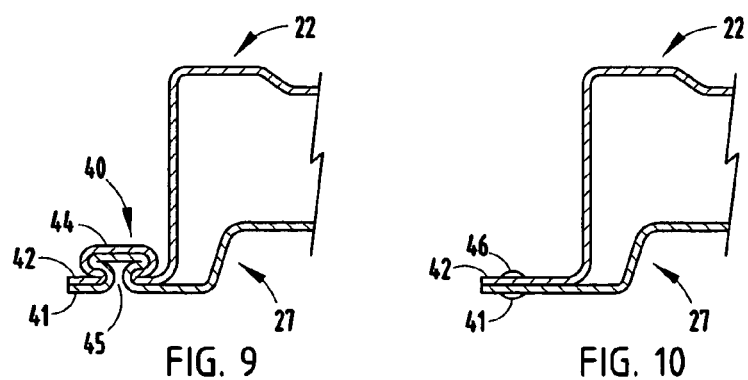
FIG. 9
FIG. 10

VEHICLE BUMPER BEAM

BACKGROUND

The present invention relates to vehicle bumper beams, and more particularly relates to a bumper beam having a front section of continuous shape and a back section attached to the front section to make a tubular beam of changing cross-sectional size.

Two basic types of bumper beams often used on modern vehicles are tubular sections (also called closed sections, such as "B" or "D" shapes) and open sections (such as "C" sections or "hat" sections). The tubular sections and also the open sections each have their own advantages and disadvantages. For example, from an engineering standpoint, bumper beams made from tubular sections are inherently more rigid and capable of absorbing and/or transmitting more energy (especially based on a strength-to-weight ratio) on impact due to the way that impact stresses are distributed around and along the tubular shapes. In contrast, open sections tend to prematurely buckle during impact since the "legs" of the open sections will spread apart, kink, and quickly lose shape upon impact. However, open sections tend to allow more styling and product variation. There is a concurrent strong desire to use high-strength materials for bumpers because it reduces weight while providing higher impact strengths (as compared to lower strength materials). However as higher and higher-strength materials are used, it becomes more and more difficult to form raw sheet stock into the desired beam shape, because the higher-strength materials are harder and harder on tooling and the presses that run them. This is especially true for stamping presses and stamping dies, where the dies move perpendicularly against a sheet to form the sheet. Roll-forming processes have the ability to form higher-strength materials than stamping processes, however roll-forming processes are limited to producing a constant cross-sectional shape along a length of the roll-formed parts.

Roll-forming is a particularly attractive manufacturing method because dimensionally-accurate bumper beams can be mass-produced at good production speeds, with minimal manual labor, and using high-strength materials, yet the tooling can be made more durable and long-lasting than stamping dies when used to shape ultra-high-strength steels and high-strength low-alloy steels. For example, Sturrus U.S. Pat. No. 5,092,512 and Sturrus U.S. Pat. No. 5,454,504 disclose roll-forming apparatus of interest. However, as noted above, a drawback to roll-forming is that the roll-forming process can only produce a constant cross section over the entire length of the part. Further, the material thickness and material strength of the raw coil stock cannot change around a given cross section, since the material begins as a unitary coil of material. Regarding the constant cross section produced by roll-forming, this often does not satisfy current styling trends which require variations in cross-sectional size along a length of the beam due to packaging space over the vehicle frame rails (versus the packaging space available at a centerline of the vehicle), or which require a longitudinal sweep with an increased curvature at corners of the vehicle (e.g. at the fenders). These styling conditions require roll-formed tubular parts to be end-formed or taper cut at their ends by secondary processes. But these secondary processes are expensive because end-forming and/or taper cutting the parts is not easy (particularly when they are made of high-strength materials). Also, the process of end-forming and/or taper cutting require more than one secondary process. For example, taper cutting requires some sort of cap to cover the sharp edges that result from the cutting process, which must be accurately fixtured and then welded in place. Alternatively, the ends of tubular sections may be reformed to better fit functional and aesthetic styling concerns (see Sturrus U.S. Pat. No. 5,306,058), but it is difficult to accurately and consistently deform the ends, thus potentially leading to unacceptable dimensional variations and high tooling wearout.

Beams made from C-shaped open sections can be formed to a desired three-dimensional shape, including non-uniform cross sections along their length, but their open section is inherently not as strong as a tubular shape during an impact. Specifically, the open sections include rearwardly-extending legs that tend to prematurely spread apart or otherwise collapse upon impact. This greatly reduces the beam's overall sectional impact strength and reduces its ability to consistently and predictably absorb energy. By stabilizing the legs of the front section, the front sections can be made much stronger and more energy-absorbing. This is sometimes done in prior art by adding reinforcements such as bulk heads, flat plating, and/or bridging between the legs to prevent the legs from prematurely spreading during an impact. (See FIG. 1 in the present drawings.) By stabilizing the legs of an open section, it can be made to come closer to matching the performance of the tubular sections. However, these additional reinforcements require expensive secondary operations since they utilize considerable fixturing and welding machinery, and they often require several additional parts and considerable assembly time and in-process inventory. Also, the process of welding multiple reinforcements to an open beam can be difficult to control, since multiple parts must be carefully separately fixtured and each and every one of the parts welded very consistently in place. Also, the location of each stabilizing strap can greatly affect impact strengths along the beam.

To summarize, packaging and performance requirements of bumper beams on vehicles and related vehicle front end (or rear end) components often increase the complexity of a bumper design since they result in the addition of other structural components, which might include bridges, bulkheads, radiator supports, fascia supports, fascia, and the like. Or they may require end treatment of the bumper beam to include end-forming or taper cutting, so as to form an increased angle at an end of the bumper in front of the fenders. This increase in complexity results in an increase in cost due to substantial secondary processing. It also results in difficult tradeoffs between function and styling criteria. It is desirable to provide a design and process that overcomes the drawbacks of constant cross section roll-formed sections, yet that takes advantage of roll-forming processes as a way of forming ultra-high-strength materials for use in bumper beams, as discussed below. Also, it is desirable to provide design flexibility that allows tuning of the bumper beam in the bumper development program, which can be very important for timing and investment reasons. At the same time, it is desirable that the ultra-high-strength steels be an option for components so that the bumper beam can be designed for optimally high strength-to-weight ratios. Still further, even though ultra-high-strength steels are used, it is desired that the arrangement allow for some use of less expensive materials and of materials that allow the use of relatively simple forming and bending tooling to minimize investment while still being able to form the ultra-high-strength materials without expensive tooling and without having tooling quickly wear out. In other words, it is desirable to utilize stamped or molded reinforcing components where possible and in combination with high-strength materials where it makes practical sense to do so.

An additional problem is that ultra-high-strength materials are difficult to form in stamping presses, or at least it is preferable not to do so. Specifically, those skilled in the art prefer not to stamp materials such as ultra-high-strength steels (UHSS) because the UHSS material is so strong that it is hard to form without cracking and that it damages or quickly wears out the stamping dies and the stamping press.

Thus, a bumper beam having the aforementioned advantages and solving the aforementioned problems is desired.

SUMMARY OF THE PRESENT INVENTION

In one aspect of the present invention, a bumper beam includes a front section and a back section mated and secured together. The front section is made of metal and has a front wall and top and bottom walls defining a constant cross section and a rearwardly open cavity. The back section is also made of metal and fits against and is attached to a rear side of the front section. The back section includes a first longitudinal portion that defines with the front section a first cross-sectional shape having a first depth dimension, and includes second longitudinal portions on opposing sides of the first portions that fit against the front section to define a second cross-sectional shape. Each second cross-sectional shape has a second depth dimension different than the first depth dimension, with at least one of the first and second cross-sectional shapes being tubular and at least one of the longitudinal portions having a protruding part that fits into the cavity.

In another aspect of the present invention, a bumper beam includes a front section and a back section. The front section includes a front wall and top and bottom walls defining a constant hat-shaped cross section having a rearwardly open cavity, and is made from a material selected from a group consisting of HSLA steel and UHSS material. The back section fits against and attached to a rear side of the front section. The back section has a same length as the front section and includes a first longitudinal portion that extends between the top and bottom walls to define a first shape having a first depth dimension, and includes second longitudinal portions on opposing sides of the first portions that extend between the top and bottom walls to define a second shape having a second depth dimension. At least one of the first and second shapes is tubular. The back section is made from a material selected from a group consisting of UHSS material, HSLA steel, aluminum, and polymeric material.

In yet another aspect of the present invention, a bumper beam includes front and back sections having the shape and characteristics defined above, but where the back section is made from a lower strength and more formable material than the front section.

In another aspect of the present invention, a method comprises steps of roll-forming a front section including a front wall and top and bottom walls defining a constant cross section and a rearwardly open cavity, and stamping an elongated back section from a sheet of material, the back section having a length approximating the front section. The method further includes fitting the back section against a rear side of the front section, the back section including a first longitudinal portion that defines with the front section a first cross-sectional shape having a first depth dimension, and including second longitudinal portions on opposing sides of the first portions that fit against the front section to define a second cross-sectional shape having a second depth dimension. The method still further includes attaching the back section to the front section to form a reinforced beam section.

An object of the present invention is to provide a design that accommodates complexity without a concurrent increase in cost due to the need for substantial secondary processing.

Another object of the present invention is to provide a design and process that overcomes the drawbacks of constant cross section roll-formed sections, yet that allows their use to make beam sections with ultra-high-strength materials.

Another object of the present invention is to provide design flexibility that allows tuning of the bumper beam (early or late) in the bumper development program, which can be very important for timing and investment reasons.

Another object of the present invention is to provide a design that allows use of materials such as ultra high-strength steels for components so that the bumper beam can be designed for optimally high strength-to-weight ratios, yet while keeping the ability to provide optimal beam strengths in particular regions of the beam.

Another object of the present invention is to provide an arrangement allowing for relatively simple forming and bending tooling to minimize investment while still being able to form the ultra-high-strength materials without prohibitively expensive tooling and without having tooling and/or stamping presses quickly wear out.

Another object of the present invention is to provide a bumper beam design where a size of the beam's tubular cross section can easily and substantially be varied across an entire length of the bumper beam, even where very high-strength materials are used. Yet this can be accomplished without substantial secondary processing and/or heat treating and/or annealing.

Another object is to provide a bumper beam that optimally utilizes roll-forming processes and stamping processes to make component sections of the beam.

The present invention overcomes the drawbacks of constant cross section roll-formed sections, by providing for an optimized utilization of geometry and material to produce a bumper beam that possesses the strength and rigidity characteristics of a tubular bumper section. The present invention combines manufacturing processes and material to produce a tubular section that has varying cross-sectional geometries along a length of the part and different material properties around the cross section of the part. The present invention differs from prior art that includes the addition of material to specific areas to provide localized stiffening.

These and other aspects, objects, and features of the present invention will be understood and appreciated by those skilled in the art upon studying the following specification, claims, and appended drawings.

BRIEF DESCRIPTION OF DRAWINGS

FIGS. 6–7 are cross sections along lines VI—VI and VII—VII in FIG. 5;

FIGS. 8–10 are alternative attachment structures for securing the front section and the back section together.

DETAILED DESCRIPTION OF PREFERRED EMBODIMENTS

Figure 1:
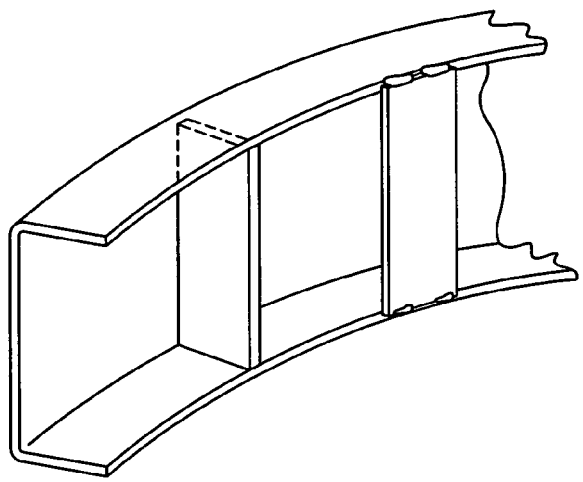
FIG. 1 is a schematic view illustrating prior art beam constructions.
Figure 2:
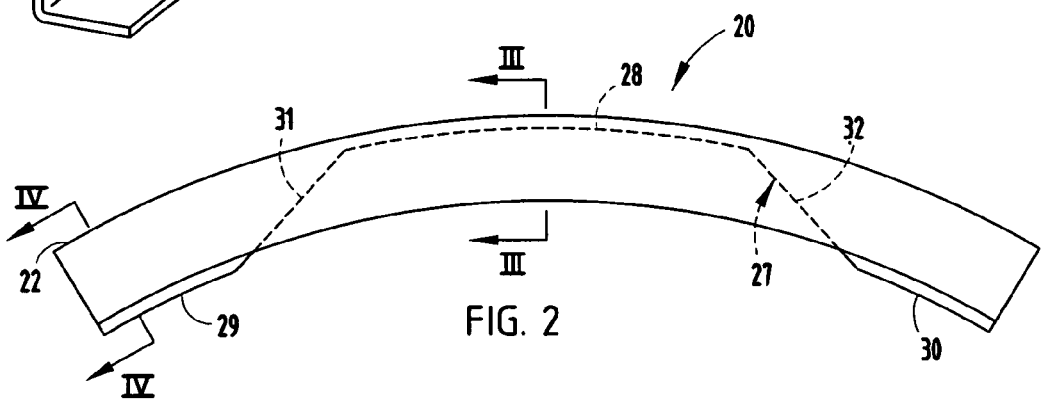
FIG. 2 is a top view of a bumper beam embodying the present invention, including an open front section (also called a "hat section") and a back section attached to its rear face.
Figure 3:
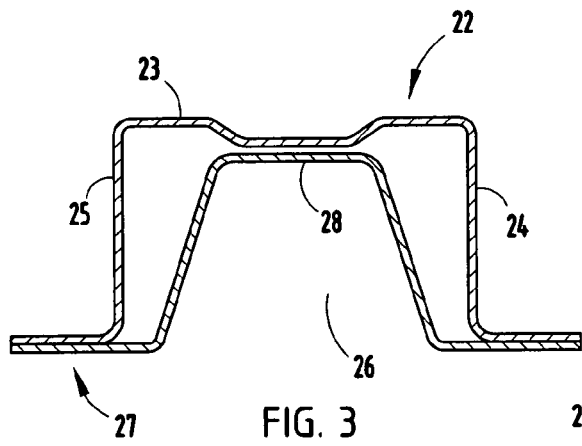
FIGS. 3–4 are cross sections along lines III—III and IV—IV in FIG. 2.
Figure 4:
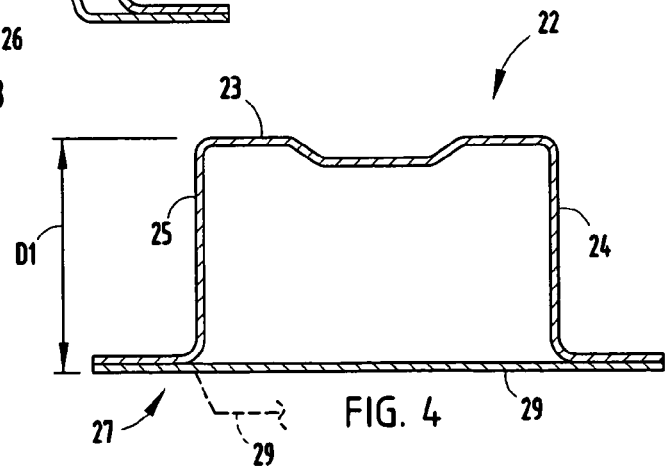
Figure 4A:
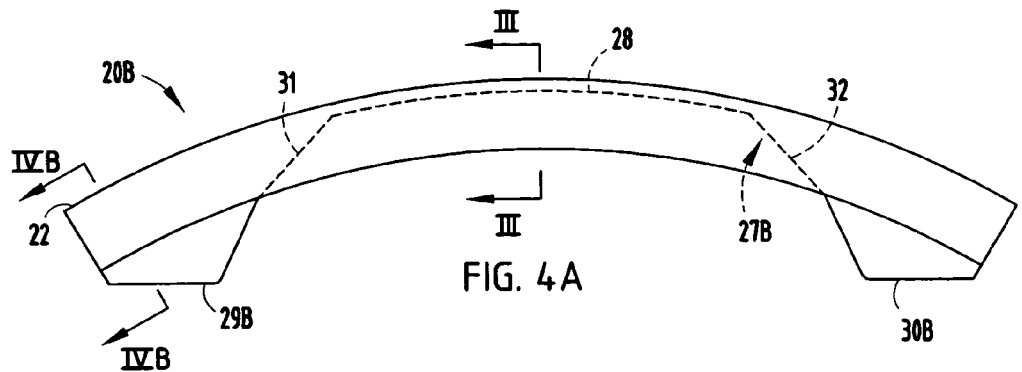
FIG. 4A is a modified version of FIG. 1.
Figure 4B:
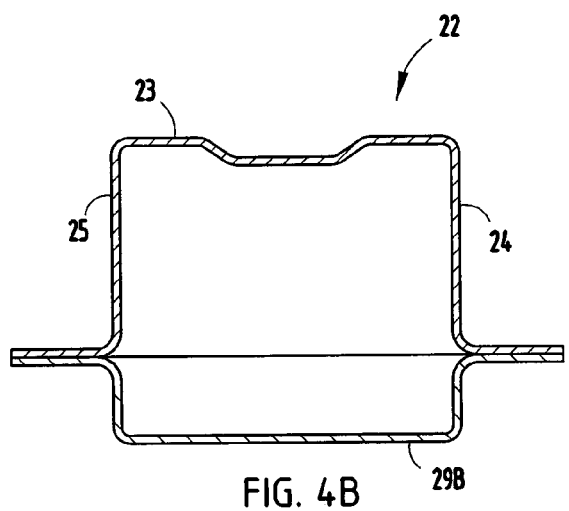
FIG. 4B is a cross section along line IVB—IVB.
Figure 5:
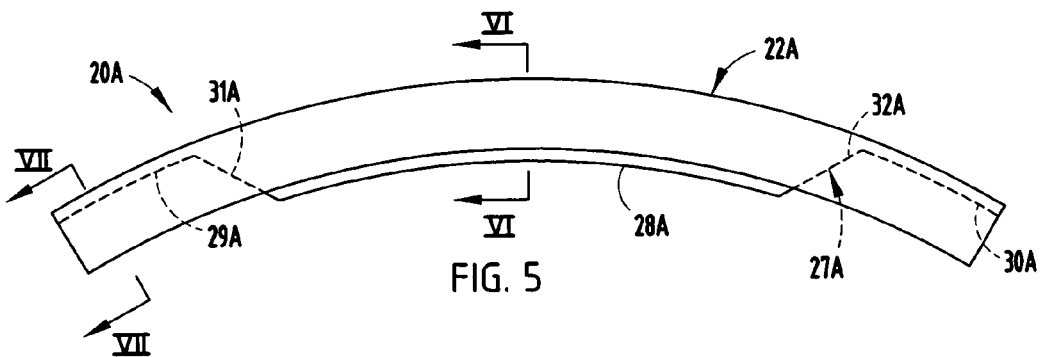
FIG. 5 is a top view of a bumper beam embodying the present invention, including an open front section and a back section attached to its rear face.

The present invention focuses on a bumper beam 20 (FIG. 2) (and beam 20A, FIG. 5; and beam 20B, FIG. 4A) utilizing a roll-formed front section (22, 22A) and a stamped or molded back section (27, 27A, 27B) mated together to form a beam of varied tubular cross-sectional shape. More specifically, the present invention represents a two-piece solution that when combined produces a tubular bumper beam with varying cross section across the length of the bumper and material properties that change around the cross section. The ability to change cross section across bumper length allows for optimization of impact beam performance, weight, and cost along any selected region of the beam. For example, the use of ultra-high-strength steels (UHSS steels) provides desirable characteristics for impact beam construction. The high mechanical properties inherent to UHSS steels support impact beam designs with high levels of energy absorption for structural components that deform with impact loading. The UHSS material also provides desirable spring back characteristics that help in returning beam sweep and cross-sectional geometry after impact loading is relieved, and also provides for excellent strength-to-weight ratios in each region. The present invention takes advantage of the material properties of UHSS material, even though the UHSS material presents difficult manufacturing issues when considered for stamping. For example, UHSS material, since they are ultra-strong, are difficult to form. They also tend to rapidly wear out tooling. In fact, the mechanical properties inherent to UHSS materials make them a poor choice for stampings. The roll-forming process is capable of forming complicated parts from UHSS due to the more stepped approach associated with forming a simple uncomplicated geometry. The limitations associated with forming UHSS materials are not as restrictive when roll-forming as compared to stamping. The present invention takes advantage of the ability to roll form the UHSS material and uses the high mechanical properties associated with the UHSS material to produce impact systems that are conscious of performance, weight, and cost.

Figure 11:
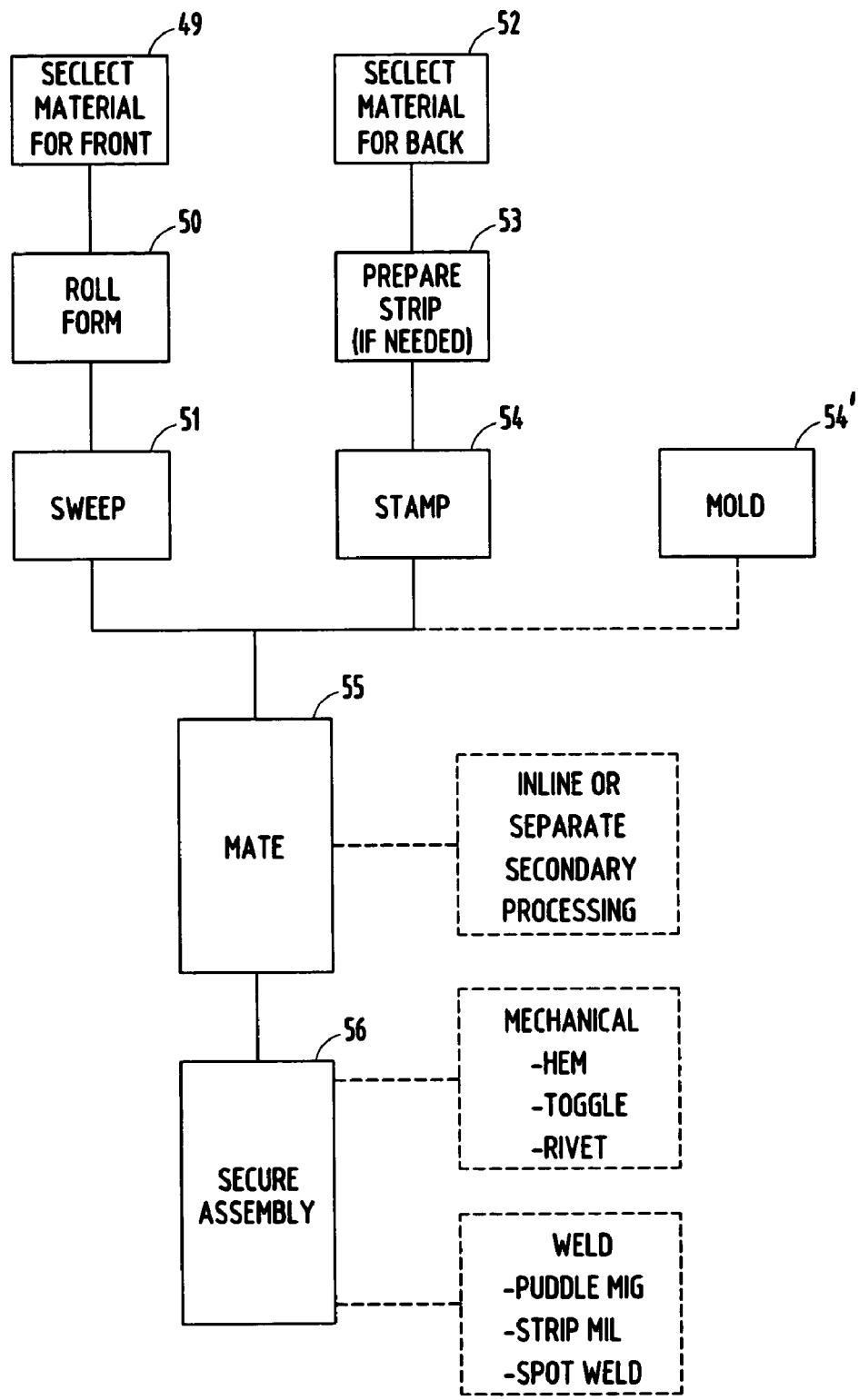
FIG. 11 is a flow chart showing a method of manufacture for beams in FIGS. 2 and 5.

In beam 20 (FIG. 2), the impact face (herein called the "front section 22") of the bumper beam is a roll-formed section made from an UHSS material. The rear face (herein called the "rear section 27") of the impact beam is a stamped part with relatively flat sections and is made from a high-strength low-alloy (HSLA) steel. The two halves of the impact beam are joined together at the flanges, such as by welding (FIGS. 2 and 11), crimping (FIGS. 9 and 11), or mechanical fastening (FIGS. 10 and 11). The combination of the two manufacturing processes and different materials produces an impact beam that can have an infinite number of carefully designed geometries along a length of the impact beam, such as differently-sized tubular sections, and different materials from front to back of the impact beam. This flexibility allows for the design of an impact beam that can be optimized for performance, weight, and cost.

It is clear from beam 20 (FIG. 2) that beam strength can be greatly varied along different portions of a length of the part. However, this advantage is even more dramatically shown by studying the beam 20A (FIG. 5), where a "deep" tubular cross section is formed at the center of the beam 20A and a "shallow" tubular (or laminar) dimension is formed at the ends of the beam 20A. For example, the design in FIG. 5 will allow for more centerline deformation while providing considerable section stiffness and reduced section deformation over the frame rails at ends of the beam 20A.

Persons skilled in the art of vehicle bumper beams will recognize that an increase in impact beam depth will increase stiffness of the section and make it more stable during impact, and further will realize the tremendous advantages of doing this at strategic locations along the beam. The beam 20A (FIG. 5) uses the stamped section to increase section depth at a vehicle's center region while providing a shallower section over the frame rails at ends of the beam. The shallow depth over the frame rails reduces the packaging space required to package the design at the rails, and will allow for more curved styling at the ends of the impact beam. The ability to easily deform the shallower depth over the vehicle frame rails is overcome by having the stamped section increase stiffness over the frame rails via geometry (i.e. the laminated "zero depth" section double-wall sections 29A and 30A at the rails) and not section depth.

The roll-formed front impact face (front section 22 or 22A) of the impact beam is a constant cross section across its center region and can either be swept at a constant sweep radius or could potentially be swept at a compound sweep radius by tooling in-line with the roll-forming process. The constrained sweep radius will cause more localized loading and potentially more system stroke (intrusion into the vehicle) as measured from the front face inward to the vehicle. Typical compound swept beams would provide for a flatter surface across the center of the impact beam and greater curvature on the ends of the impact beam. The compound sweep may be more accommodating for current styling trends in vehicles. A compound swept beam would allow for distributed loading across the front face of the impact and in turn less system stroke of the impact beam. The ability of a compound swept beam to distribute load across a greater surface area can also be replicated with a constant swept beam and an engineered energy absorber. The energy absorber would be engineered to easily crush across a greater length from impact beam center and in turn load the impact beam over a greater distance extending from impact beam center.

The front and rear sections of the impact beams can be attached using different attachment methods. These methods would include crimping or hemming (FIG. 8), welding (FIGS. 2–4, 4A–4B and 5–7), mechanical fastening processes (FIGS. 9–10), or other attachment means known in the art for securing two structural components together. Each of the illustrated methods are potentially suitable for joining and each method would potentially produce an impact beam suitable for crashworthiness. The attachment method of choice for each system constructed according to the present invention would be identified and supported with a cost analysis of each of the methods.

The present invention illustrated in the beams 20 and 20A (FIGS. 2 and 5) is an impact beam system constructed from a roll-formed UHSS front section and a stamped HSLA rear section. It is to be understood by those skilled in the art that various other materials can be used to design a system that may or may not trade off on the design criteria of performance, weight, and/or cost. For example, the front section (22 or 22A or 22B) can be made from UHSS material, HSLA material, drawable-grade steel, boron steel which is heated and quenched after forming, high-strength aluminum, extruded aluminum, polymeric material, or other engineering structural materials. The rear section (27 or 27A or 27B) can also be made from HSLA material, drawable-grade steel, boron steel which is heated and quenched after forming, high-strength aluminum, extruded aluminum, polymeric material, and other engineering structural materials. In each of these materials, their thickness and hardness can be varied within parameters of commercially available raw material. It is contemplated that the back section could be made from UHSS material, but that a shape of the back section would need to be potentially modified or simplified (such as by modifying back section 27 to include a shallower draw at center section 28, or to eliminate the flanges and side walls at sections 28, 31–32) if one desires to produce a significant number of bumpers, since the UHSS material is very tough on tooling and hard to form due to low elongation. One alternative contemplated by the present inventors is to provide a sheet of material for producing the back section (27 or 27A or 27B) from a plurality of strips welded together. For example, for beam 20 (FIG. 2), strips of UHSS material would be welded to opposite edges of a center strip of drawable grade steel. The strips of UHSS material would each have a width sufficient to form the sections 29 and 30, while the center strip of drawable grade steel would have a width sufficient to form sections 28, 31, and 32.

The ultra-high-strength steel (UHSS) material is a well known and well defined category of material in the art. UHSS material commonly has a tensile strength of about 120 to 200 KSI (or higher). The high-strength low-alloy (HSLA) steel material is also a well known and well defined category of material in the art. There are HSLA steel materials that are 120 KSI, but the higher grade HSLA materials are not usually considered stampable. Nonetheless, it should be understood that the ability to stamp is also related to material thickness, size and shape of the part being stamped, and the degree of material flow and "draw" required. HSLA steel material that can be stamped has a tensile strength commonly around 80 KSI. Boron steels and heat-treatable hardenable steels can also be used. For example, boron steels can be formed while at lower KSI strengths, and then hardened either during a stage of the forming process or in secondary processing. Higher-strength aluminum materials are also well known in the art. For example, it is contemplated that aluminum series 6000 materials will work in the present invention. The aluminum series 6000 material commonly has a tensile strength of up to about 40 KSI. Some extrudable grades of aluminum may also work in forming front section 22, such as extrudable aluminum series 6000 or 7000 materials. Back sections 22 may also be made from glass-reinforced nylon, glass-reinforced polyester, or other (reinforced or unreinforced) structural polymers.

As noted above, the illustrated bumper beam 20 (FIG. 2) includes a front section 22 and a rear section 27. The front section 22 include a front wall 23 and top and bottom walls 24 and 25 defining a constant open cross section (also often called a hat-shaped section) that defines a rearwardly open cavity 26. The illustrated front section 22 is longitudinally swept (i.e. curved), such as by a process disclosed in Sturrus U.S. Pat. Nos. 5,306,058 and 5,395,036, the entire contents of which are incorporated herein by reference for the purpose of teaching formation of the front section 22. The bumper beam 20 further includes an elongated back section 27 fit against and attached to a rear side of the front section 22. The back section 27 includes a longitudinal center portion 28 that is curved longitudinally to match the associated center region of the beam 22, and that is deep-drawn to generally match a cross-sectional shape of the front section 22. The back section 27 further includes end portions 29 and 30 that are also curved longitudinally to match the associated end regions of the beam 22, and still further includes angled intermediate portions 31 and 32 that interconnect the end portions 29 and 30 to the center portion 28. The center portion 28 is hat-shaped and includes a middle portion that lies relatively close or in contact with the front wall 23 in the center region in a laminar arrangement, thus minimizing a total depth and strength of the "tubular part" of the cross section in the center area. At the same time, the top and bottom portions of the hat section stiffen and help stabilize the corresponding walls in the center of the front section 22. It is noted that the center region of the bumper beam 20 must be strong enough to pass impact testing against a center of the bumper beam 20 without unacceptable damage, yet the center region must be flexible enough to absorb energy or transmit energy for functional impact testing so that the vehicle itself does not become prematurely damaged during a front impact.

In the illustrated center region, the center portion 28 lies relatively tight against or in contact with the front wall 23 of the front section 22, but it is contemplated that any desired spacing can be created, such that the illustrated arrangement is intended to illustrate both a "flat tube" in the center region as well as a "non-flat" or "thin" tube in the center region. In the end regions, the end portions 29 and 30 of the back section 27 are fit against the rear edges of the top and bottom walls 24 and 25 to form a tubular cross-sectional shape having a "deep" depth dimension D1. It is contemplated that the end portions 29 and 30 of the back section 27 can be relatively flat (as illustrated by the solid lines in FIG. 4), or that the end portions 29 and 30 can have a reverse hat shape that extends in a direction opposite the hat shape of the center portion 28 of the back section 27 (as illustrated by the dashed lines in FIG. 4).

The angled intermediate portions 31 and 32 provide a changing cross-sectional tubular shape that transitions between the center and end portions of the beam 20. It is contemplated that the intermediate portions 31 and 32 can be deep-drawn to form mounting surfaces adapted for attachment to vehicle frame rails, such as the illustrated beam 20B having a back section 27B with deep-drawn mounting surfaces 29B and 30B (FIG. 4A) which are coplanar and spaced apart as desired.

It is contemplated that the back section 27 will be made by an optimal process. The illustrated back section 27 can be stamped using stamping technology. The simplicity of the back section 27 (FIG. 2) potentially allows it to be made from high-strength low-alloy (HSLA) material since it incorporates relatively simple bends. However, it is contemplated that drawable grade steel will be used whenever the back section 27 has "deep" areas that require material flow. Alternatively, it is contemplated that the back section 27 could be molded of polymeric material.

It is contemplated that top and bottom edges of the back section 27 can be secured to the front section 22 by several different means. For example, where steels are used for the front section 22 and the back section 27, MIG puddle welding or "standard" MIG welding can be used. It is also contemplated that various welding such as spot-welding can be used to secure edge flanges of the back section 27 and front section 22 together. Also, rivets and other mechanical attachment means known in the art can be used. Again, the optimal process will depend upon the strength and properties of the back section 27 and the front section 22, and also will depend on the functional requirements of the beam 20. Where a formable material is used, such as drawable steel, it is conceived that alternative attachment methods can be used such as a hemmed flange 35 (FIG. 9) where the edges of the back section 27 near the ends are doubled back on themselves to capture the edges 36 of the front section 22. Where the materials of the front and back sections differ, mechanical attachment may be preferred, such as rivets, hemming, or toggle-lock methods.

It is also conceived that a combination of attachment methods can be used, such as by using welding at critical high-stress areas, and rivets or other means on less-stressed attachment areas. Drawable steel and aluminum, depending on their grade, can be toggle-locked together, which is a mechanical connection using the material of the sheets themselves to form the rivet-like connection. An exemplary toggle lock connection 40 is shown in FIG. 9. It is noted that toggle lock technology is commercially available. In the toggle lock connection 40, the edge flanges 41 and 42 abut along end regions of the back section 27 and the front section 22. A tooling pin (not shown) is forced through the edge flanges 41 and 42 to stretch the flange material to form a double-thickness protrusion. The tooling pin is removed (or temporarily left in place during the peening step), and then the section is peened or struck in a manner causing the head 44 to mushroom while the neck 45 remains relatively thin. As a result the material of the back section's flange 41 in the head 44 is trapped by the material of the front section's neck 45 after the step of peening. The effect is much like a rivet 46, as shown in a lower portion of the FIG. 10. It is of course contemplated that rivets 46 could also be used for securement. Where the material of the reinforcement and/or the front section 22 are substantially different materials (such as one is steel and the other is aluminum or plastic), mechanical attachment such as by the use of rivets 46 or a hemmed edge are potentially a realistic and desirable option. Hemming the flanges 41–42 (i.e. folding one flange 41 back on itself to capture the mating flange 42) is an attractive alternative attachment method since it uses the material of the sections 22 and 27 themselves without the need for additional parts or components. The illustrated flange 41 is continuous, though a slit 48 could be used.

One contemplated alternative is to weld multiple strips of material together to form a long roll, from which the back section 27 would be made. The multiple strips of material would be chosen to have optimal strengths and material properties in each of their ultimate positions in the back section 27. For example, end portions 29 and 30 could be made from one material (such as UHSS), while the intermediate portions 31 and 32 and the center portion 28 could be from a more ductile or lower strength material such as HSLA steel. Also, the portions 28–32 could each have different material thicknesses and properties. A variety of different options are possible, as will be quickly understood by a person skilled in the art of vehicle bumper manufacture and in the art of roll-forming and stamping.

A bumper beam 20A (FIGS. 5–7) is similar to bumper beam 20 in many aspects. To reduce redundant discussion, the same numbers are used to identify the same or similar parts, features and characteristics, but with the addition of the letter "A". This is done to reduce redundant discussion, and not for another purpose.

The bumper beam 20A (FIGS. 5–7) is similar to bumper beam 20 in that it includes a front section 22A and a back section 27A. But in a center region of the bumper beam 20A, the back section 27A forms a tubular section with the front section 22A. At the same time, the illustrated end portions 29A and 30A of the back section 27A lie relatively close to and flat against the ends of the front section 22A. Thus, the bumper beam 20A has a tubular section across its center region, while its ends are stiffer. Potentially, the ends of the back section 27A have a B-shaped cross section as opposed to a laminar double-thick arrangement. The front section 22A and back section 27A of bumper beam 20A could be secured together by any of the illustrated attachment means shown in FIGS. 8–10 and/or the other attachment methods discussed herein.

The method of the present invention is shown in FIG. 11. The method includes selecting a strip of material in a step 49 (such as UHSS material, or UHLA steel material), and then roll-forming the strip of material in a step 50 to form an open front section 22 (which can be C-shaped, W-shaped, or hat-shaped), including (optionally) sweeping the front section in a step 51 to form a longitudinally curved part. The material for the back section 27 is selected in a step 52, prepared as required in a step 53, and stamped in a step 54. The step 53 of preparing the strip may include welding multiple strips (tailor welded blanks) together and/or heat-treating (e.g. annealing) various sections of a single strip so that particular strength characteristics end up at predetermined locations on the finish back section 27. It is contemplated that where heat-treating is used, this preparation can be done before, during, or after the step of stamping. Alternatively, instead of steps 52–54, the back section 27 can be made by molding in step 54 (or alternatively can be made using other forming and bending techniques). The back section 27 is then mated together with the front section 22 in a step 55, and then attached in a step 56. As noted above, the step 55 of mating the back section 27 to the beam 22 can form a variety of different shapes, including different tubular cross-sectional sizes and depths along a length of the beam 20. It is contemplated that the mating step 55 can be done in-line with the roll-forming machine, or done off-line in a secondary operation at an end of the roll-forming process such that it forms part of a continuous manufacturing process, or done off-line in a separate operation. Another option is to take the roll-formed front section and feed it into a transfer press where it is fastened to the back section after the back section has been stamped. For example, the transfer press could include tooling for stamping the back section 27. In a last stage (or near-to-last stage) of the stamping operation, the roll-formed front section 22 would be fed into the transfer press, and attached to the front section 22 such as by a hemming operation, welding, riveting, or a toggle-lock process. Alternatively, one could use mechanical fasteners or spot-welding in the press. It is contemplated that the attachment step 56 can include a variety of different attachment means, including welding (MIG puddle welding, standard MIG welding, spot-welding, mechanical fastening such as hemming attachment, toggle lock attachment (see earlier discussion on toggle lock and UHSS materials), rivet attachment, and other attachment means).

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A bumper beam comprising:
a metal front member formed to include a front wall and top and bottom walls defining a constant cross section and a rearwardly open cavity; and
a back member formed to fit against the front member and having flanges that abut and that are attached to the front member, the back member including a first longitudinal center portion that defines with the front member a first cross-sectional shape having a first depth dimension, and including second longitudinal end portions on opposing sides of the center portion that engage the front member to define a second cross-sectional shape, each second cross-sectional shape having a second depth dimension different than the first depth dimension, with at least one of the first and second cross-sectional shapes being tubular and at least one of the longitudinal portions fitting partially into the cavity.

2. The bumper beam defined in claim 1, wherein the first and second cross-sectional shapes are both tubular.

3. The bumper beam defined in claim 1, wherein only one of first and second cross-sectional shapes are tubular, and the other forms a flat double-sheet arrangement.

4. The bumper beam defined in claim 1, wherein the front member defines a continuous open cross section suitable for being formed by a roll-forming process.

5. The bumper beam defined in claim 4, wherein the back member is made from a flat sheet of formable material suitable for being made using a stamping manufacturing process.

6. The bumper beam defined in claim 1 including intermediate portions that connect the center portion to the end portions and that extend at an angle to each of the center and end portions.

7. The bumper beam defined in claim 1, wherein the front member is made from ultra-high-strength steel (UHSS) material and the back member is made from a material other than ultra-high-strength steel (UHSS) material.

8. The bumper beam defined in claim 7, wherein the other material is chosen from one of high-strength low-alloy (HSLA) steel material, drawable steel, and aluminum.

9. The bumper beam defined in claim 1, wherein the front member is made from high-strength low-alloy (HSLA) steel material and the back member is chosen from one of ultra-high-strength steel (UHSS) material, drawable steel, and aluminum.

10. The bumper beam defined in claim 1, wherein the back member is made from a lower strength material than the front member.

11. The bumper beam defined in claim 1, wherein the front member and the back member are welded together along the flanges of the back member.

12. The bumper beam defined in claim 1, wherein the flanges are fastened together using mechanical fastening means.

13. The bumper beam defined in claim 1, wherein the second longitudinal portions defining relatively-flat coplanar mounting surfaces at opposite ends of the bumper beam.

14. A bumper beam comprising:
a front member defining first top and bottom flanges; and
a back member defining second top and bottom flanges that are fixedly attached to the first top and bottom flanges, respectively, along a length of the flanges from end to end of the back member; the back member having a same length as the front member but being made of a different material, the front and back members combining to define a center portion and end portions and transition portions extending from ends of the center portion to the end portions, with at least one of the center and end portions being tubular, and the other of the center and end portions having an intermediate part comprising a longitudinally changing cross-sectional shape extending between the top and bottom flanges where the front and back members are positioned generally adjacent each other.

15. The bumper beam defined in claim 14, wherein the back member is made from a material having a strength different than the material of the front member.

16. The bumper beam defined in claim 15, wherein the back member is made from a material having a lower strength than the material of the front member.

17. The bumper beam defined in claim 14, wherein the end portions of the back member include walls having a constant thickness and that define relatively-flat coplanar mounting surfaces at opposite ends of the bumper beam.

18. The bumper beam defined in claim 14, wherein the back member is made from ultra-high-strength steel (UHSS).

19. A bumper beam comprising:
a front member formed to include a front wall and top and bottom walls defining a rearwardly facing cavity; and
a back member formed to fit against the front member to close the cavity, the back member having flanges that are fixedly attached to edges of the front member that is at least partially tubular along a length of the back member, the front and back members combining to define a longitudinal center portion and end portions outboard of ends of the center portion and also intermediate portions that transition between and interconnect the end portions to the center portion, the center portion and end portions forming different tubular shapes adapted for center impact and corner impact, respectively, the front and back members being different materials so that the materials and geometry are tuned for performance, weight, and cost along the length and around a circumference of the bumper beam, the back member at the end portions having relatively flat wall sections that are coplanar and aligned for forming mounting surfaces thereon.

20. The bumper beam defined in claim 19, wherein the flat wall sections have a uniform wall thickness.

21. The bumper beam defined in claim 19, wherein the flat wall sections define and form mounts for the bumper beam.

22. The bumper beam defined in claim 19, wherein the length comprises a curvilinear shape.

23. A bumper beam comprising:
a front member formed to include a front wall and top and bottom walls and defining a rearwardly facing surface; and
a back member formed to fit against the rearwardly facing surface of the front member, the back member having edge flanges that are fixedly attached to edges of the front member to form a structural beam, the front and back members combining to define a longitudinal center portion and end portions outboard of ends of the center portion and also intermediate portions that transition between and interconnect the end portions to the center portion, the center portion and end portions forming different shapes adapted for and designed for center impact and corner impact, respectively, at least one of the different shapes being tubular, the front and back members being different materials, the materials and geometry being tuned for performance, weight, and cost along the length and around a circumference of the bumper beam, one of the center and end portions having an intermediate part comprising a longitudinally changing cross-sectional shape extending between the top and bottom walls where the front and back members are positioned adjacent each other.

24. The bumper beam defined in claim 23, wherein the back member is made from a material have a lower strength than the material of the front member.

25. The bumper beam defined in claim 23, wherein the end portions of the back member define relatively-flat coplanar mounting surfaces at opposite ends of the bumper beam.

26. A bumper beam for a vehicle comprising:
front and rear structural members extending similar lengths but being made of different materials, the front and rear structural members being fixedly secured together along edge flanges to form a tubular beam assembly that defines varying cross-sectional geometries along the assembly's length, with the varying cross-sectional geometries and different material properties combining for specifically-designed impact properties at particular locations along the assembly's length, with at least one portion of the cross-sectional geometries being tubular and with at least one vertical mid-portion of the rear structural member fitting partially into a cavity formed by the front structural member.

27. The bumper beam defined in claim 26, wherein the back structural member is made from a material have a lower strength than the material of the front structural member.

28. The bumper beam defined in claim 26, wherein the end portions of the back structural member define relatively-flat coplanar mounting surfaces at opposite ends of the bumper beam.

29. A bumper beam comprising:
a front member formed to include a front wall and top and bottom walls defining a cross section with a rearwardly open cavity; and
a back member formed to fit against the front member and having flanges that are attached to the front member, the back member including a first longitudinal center portion that defines with the front member a first cross-sectional shape having a first depth dimension, and including second longitudinal end portions on opposing sides of the center portion that engage the front member to define a second cross-sectional shape, each second cross-sectional shape having a second depth dimension different than the first depth dimension, with at least one of the first and second cross-sectional shapes being tubular and at least one of the longitudinal portions fitting partially into the cavity.

30. The bumper beam defined in claim 29, wherein the front and rear members include wall sections that are adjacently positioned in at least one of the center and end portions.

31. The bumper beam defined in claim 29, wherein the end portions of the back member include flat wall sections that are coplanar and aligned and adapted to form mounts.

32. The bumper beam defined in claim 29, wherein the front member includes polymeric material.

33. The bumper beam defined in claim 29, wherein the rear member includes polymeric material.

34. The bumper beam defined in claim 29, including mechanical attachment means attaching the front member to the back member.

35. The bumper beam defined in claim 29, wherein the front member has a relatively constant cross section capable of being roll formed, and the rear member is made by a non-roll forming process.

36. The bumper beam defined in claim 35, wherein the rear member is a stamped component and has a configuration permitting formation by a stamping process.

* * * * *